United States Patent
Higuchi et al.

(10) Patent No.: US 8,284,302 B2
(45) Date of Patent: Oct. 9, 2012

(54) ELECTRONIC DEVICE WITH LOW BATTERY WARNING

(75) Inventors: Yoshinari Higuchi, Kanagawa (JP); Satoshi Ebato, Tokyo (JP); Shinji Ieki, Aichi (JP)

(73) Assignee: Sony Corporation (JP)

( * ) Notice: Subject to any disclaimer, the term of this patent is extended or adjusted under 35 U.S.C. 154(b) by 863 days.

(21) Appl. No.: 11/504,244

(22) Filed: Aug. 14, 2006

(65) Prior Publication Data

US 2006/0274192 A1 Dec. 7, 2006

Related U.S. Application Data

(62) Division of application No. 09/510,856, filed on Feb. 23, 2000, now Pat. No. 7,102,684.

(30) Foreign Application Priority Data

Feb. 26, 1999 (JP) .................................. P11-051871

(51) Int. Cl.
  *H04N 5/225* (2006.01)
(52) U.S. Cl. .................................... 348/372; 348/333.04
(58) Field of Classification Search .................. 348/372, 348/333.02, 333.04; 320/106, 125, 132–136
See application file for complete search history.

(56) References Cited

U.S. PATENT DOCUMENTS

| | | | |
|---|---|---|---|
| 4,269,494 A | 5/1981 | Shiozawa et al. | |
| 4,598,243 A * | 7/1986 | Kawakami | 323/349 |
| 5,099,210 A * | 3/1992 | Fortney et al. | 324/433 |
| 5,164,652 A * | 11/1992 | Johnson et al. | 320/106 |
| 5,287,286 A * | 2/1994 | Ninomiya | 702/63 |
| 5,633,573 A | 5/1997 | van Phuoc et al. | |
| 5,635,813 A * | 6/1997 | Shiga et al. | 320/106 |
| 5,684,387 A * | 11/1997 | Patino | 320/106 |
| 5,870,685 A | 2/1999 | Flynn | |
| 6,157,169 A * | 12/2000 | Lee | 320/132 |
| 6,400,123 B1 * | 6/2002 | Bean et al. | 320/132 |

FOREIGN PATENT DOCUMENTS

EP 0560510 A1 9/1993
(Continued)

OTHER PUBLICATIONS

"Smart Battery Data Specification", Revision 1.1, Dec. 11, 1998.*

(Continued)

*Primary Examiner* — Aung S Moe
*Assistant Examiner* — Chriss Yoder, III
(74) *Attorney, Agent, or Firm* — Lerner, David, Littenberg, Krumholz & Mentlik, LLP

(57) ABSTRACT

A video camera includes a processor that is operable to obtain a capacity value of a battery by communicating over a communications line with a battery pack that contains the battery and which provides power to the video camera. The capacity value indicates a number of cell structures in the battery. The processor is also operable to set a correction value based on the capacity value, to correct a low power warning voltage value by subtracting the correction value from the low power warning voltage value, to generate a low power warning when a detected battery voltage is less than or equal to the corrected low power warning voltage value, and to generate a residual power indication when the detected battery voltage is greater than the corrected low power warning voltage value. A display is operable to display the low power warning or the residual power indication.

11 Claims, 5 Drawing Sheets

FOREIGN PATENT DOCUMENTS

| | | |
|---|---|---|
| JP | 58-152228 A | 9/1983 |
| JP | 63-110918 | 5/1988 |
| JP | 3-183328 | 8/1991 |
| JP | 4-130927 | 5/1992 |
| JP | 5-265072 | 10/1993 |
| JP | 7-176333 A | 7/1995 |
| JP | 8-023464 | 1/1996 |
| JP | 8-065559 | 3/1996 |
| JP | 09269523 | 10/1997 |

OTHER PUBLICATIONS

Office Action from corresponding Japanese Application No. HEI 11-051871, Jan. 7, 2009.

Office Action from corresponding Korean Application No. 10-2000-0008730. (Aug. 30, 2006).

* cited by examiner

FIG.1A  ONE-STAGE STRUCTURE
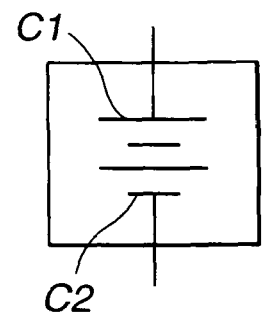
FIG.1B  TWO-STAGE STRUCTURE
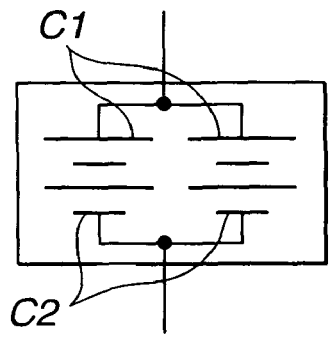
FIG.1C  THREE-STAGE STRUCTURE
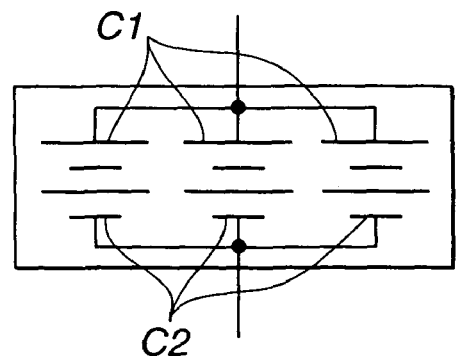

ELECTRONIC DEVICE WITH LOW BATTERY WARNING

CROSS-REFERENCE TO RELATED APPLICATIONS

This application is a divisional of U.S. application Ser. No. 09/510,856, filed on Feb. 23, 2000, now U.S. Pat. No. 7,102,684, which claims priority from Japanese Application No. P11-051871, filed Feb. 26, 1999, all of which are incorporated herein by reference.

BACKGROUND OF THE INVENTION

The present invention relates to a video camera which displays a warning when a battery becomes near empty, and a warning method thereof.

A conventionally known power source of a video camera is, for example, a battery pack including a lithium ion battery, NiCd battery, nickel hydrogen battery, or the like as a secondary battery cell. The battery pack is constructed to be detachable from a battery attachment section provided in the video camera apparatus body.

Normally, in an electric apparatus such as a video camera using this battery pack as a power source, the battery end voltage is determined depending on the terminal voltage of the battery pack. Also, a display of a warning prior to end of the battery is determined depending on the terminal voltage of the battery pack. The battery end voltage and the voltage for displaying a warning prior to end of battery are generally fixed.

Meanwhile, the discharge characteristics (defined by subtracting a discharge time from a between terminal voltage) of battery packs differs depending on the type of the battery cell. Even the same cell may have different discharge characteristics, depending on the cell structure method. Therefore, if the battery end voltage Ve and the warning display voltage Vp prior to end of the battery are both fixed, there is a problem that the time from when a warning is displayed to when the battery actually ends greatly varies depending on the type of the battery pack. For example, suppose three types of cell structures, e.g., a one-stage cell structure in which two battery cells C1 and C2 are connected in series as shown in FIG. 1(A), a two-stage cell structure in which two stages each consisting of two battery cells C1 and C2 connected in series are connected in parallel as shown in FIG. 1(B), and a three-stage cell structure in which three stages each consisting of two battery cells C1 and C2 are connected in series are connected in parallel as shown in FIG. 1(C). Between these three cell structures types, the times T1, T2, and T2 at which warnings prior to end are displayed are greatly different from each other as indicated by the relationships between the battery discharge characteristics F1, F2, and F3 and the warning display times T1, T2, and T3 in FIG. 2.

This problem means lowered reliability with respect to warning display near the battery end of the electric apparatus, and the influence therefrom increases as the consumption power of the apparatus decreases.

BRIEF SUMMARY OF THE INVENTION

The present invention hence has an object of providing a video camera and a warning display method thereof which enable warning display with high reliability.

According to an aspect of the invention, a video camera includes a processor operable to obtain a capacity value of a battery by communicating via a communications line with a battery pack that contains the battery, the battery providing power to the video camera, the capacity value indicating a number of cell structures in the battery, to set a correction value based on the capacity value, to correct a low power warning voltage value by subtracting the correction value from the low power warning voltage value, to generate a low power warning when a detected battery voltage is less than or equal to the corrected low power warning voltage value, and to generate a residual power indication when the detected battery voltage is greater than the corrected low power warning voltage value. A display is operable to display the low power warning or the residual power indication.

According to another aspect of the invention, a video system includes a video camera body, a battery pack including a battery having at least one battery cell, and a communications line connected to the video camera body and said battery pack. The video camera body includes a processor operable to obtain a capacity value of said battery by communicating with said battery pack via said communications line, the capacity value indicating a number of cell structures in the battery, to set a correction value based on the capacity value, to correct a low power warning voltage value by subtracting the correction value from the low power warning voltage value, to generate a low power warning when a detected battery voltage is less than or equal to the corrected low power warning voltage value, and to generate a residual power indication when the detected battery voltage is greater than the corrected low power warning voltage value. A display is operable to display the low power warning or the residual power indication.

According to yet another aspect of the invention, a battery pack for a video system includes a cell structure section including at least one battery cell and having at least one stage, a power terminal operable to supply power to a video camera body of the video system over a power source line, a memory operable to store a capacity value of said battery, the capacity value indicating a number of battery cells in said battery, a communications terminal operable to provide a connection to a communications line connected between said battery pack and the video camera body, and a processor operable to provide the capacity value stored in said memory to the video camera body using said communications terminal and the communications line. The video camera body thereby sets a correction value based on the provided capacity value, corrects a low power warning voltage value by subtracting the correction value from a low power warning voltage value, detects a battery voltage of said at least one battery cell, generates a low power warning when the detected battery voltage is less than or equal to the corrected low power warning voltage value, generates a residual power indication when the detected battery voltage is greater than the corrected low power warning voltage value, and displays the low power warning or the residual power indication.

As described above, according to the present invention, a voltage correction value, which is determined based on information concerning the capacity of the cell in the battery pack, is subtracted from a prior-to-end warning voltage value to obtain a reference voltage value, and the obtained reference voltage value is compared with the voltage value of the battery pack. A warning is displayed when the voltage value of the battery pack becomes smaller than the reference voltage value. As a result, the time when the warning is displayed can be constant with respect to any of battery packs having various kinds of cell structures so that a warning display can be achieved with high reliability.

BRIEF DESCRIPTION OF THE SEVERAL VIEWS OF THE DRAWINGS

FIG. 1 is a view schematically showing the cell structure in a battery pack.

In the followings, embodiments of the present invention will be explained specifically with reference to the drawings.

DETAILED DESCRIPTION OF THE INVENTION

Figure 2:
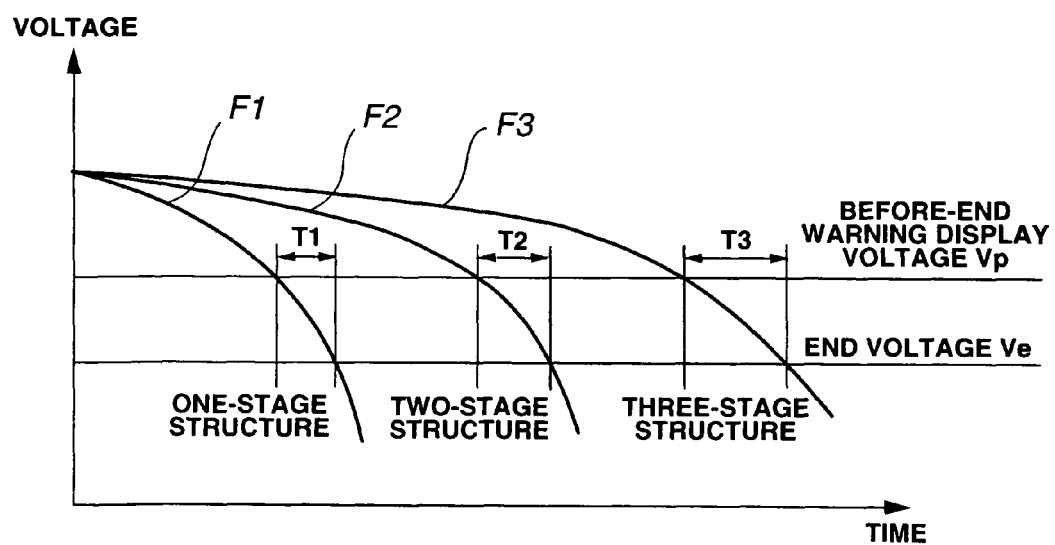
FIG. 2 is a view schematically showing the relationships between the battery discharge characteristics and the warning display times of the battery packs respectively having a one-stage structure, two-stage structure, and three-stage structure in a conventional electronic apparatus.
Figure 3:
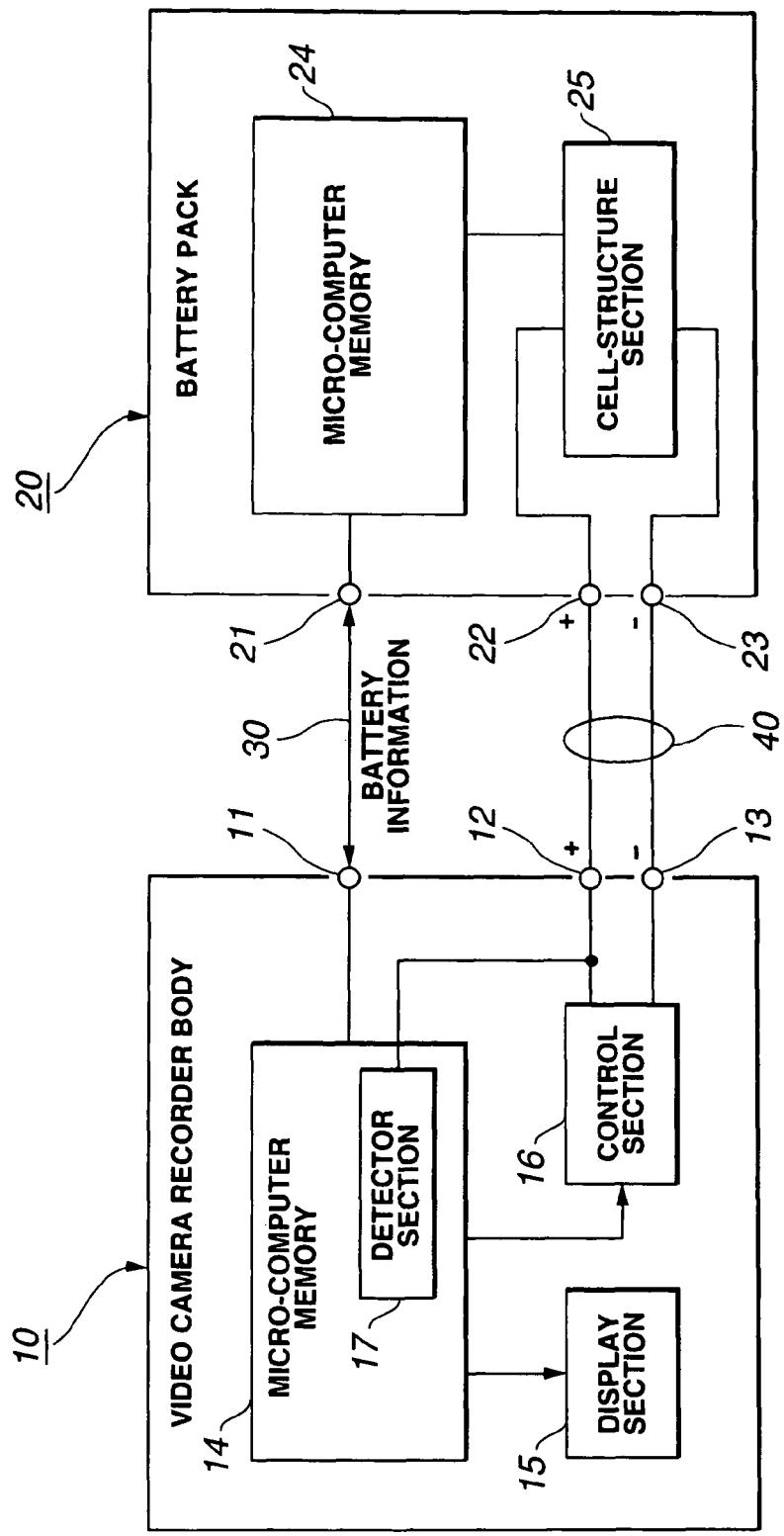
FIG. 3 is a block diagram showing the structure of a battery power source control system of a camera-integrated video recorder to which the present invention is applied.

The present invention is practiced as a camera-integrated video recorder mounting a battery power source control system having a structure as shown in FIG. 3. This camera-integrated video recorder is constructed by connecting a video camera recorder body 10 with a battery pack 20 over a power source line 40 and a communication line 30.

The video camera recorder body 10 is provided with a positive terminal 12 and a negative terminal 13 connected with the power source line 40, and a communication terminal 11 connected with the communication line 30. Also, the video camera recorder body 10 is provided with a microcomputer 14 that transmits data to and receives data from the outside through the communication terminal 11, a display section 15 controlled by the microcomputer 14, a power control section 16, and the like.

The video camera recorder body 10 is supplied with power from the battery pack 20 through the positive and negative terminal 12 and 13, and the microcomputer 14 receives internal information concerning the battery pack 20 through the communication terminal 11. Also, the microcomputer 14 includes an internal voltage detector section 17 and detects the voltage of the power source supplied through the positive and negative terminals 12 and 13 as will be described later. Based on the detection result therefrom, the microcomputer 14 controls the display section and the power control section 16.

Also, the battery pack 20 is provided with positive and negative terminals 22 and 23, respectively, for inputting power, which are connected with the power source line 40, and a communication terminal 21 connected with the communication line 30. This battery pack 20 comprises a microcomputer 24 which functions to transmit and receive data to and from the outside through the communication terminal 11, and a cell structure section 25 internally including a battery cell which supplies the video camera recorder body 10 with power through the positive and negative terminals 22 and 23, and the like. The cell structure section 25 internally includes a plurality of battery cells which are constructed in a two-stage or three-stage structure. The status of the battery cells in the cell structure section 25 is monitored by the microcomputer 24.

Figure 4:
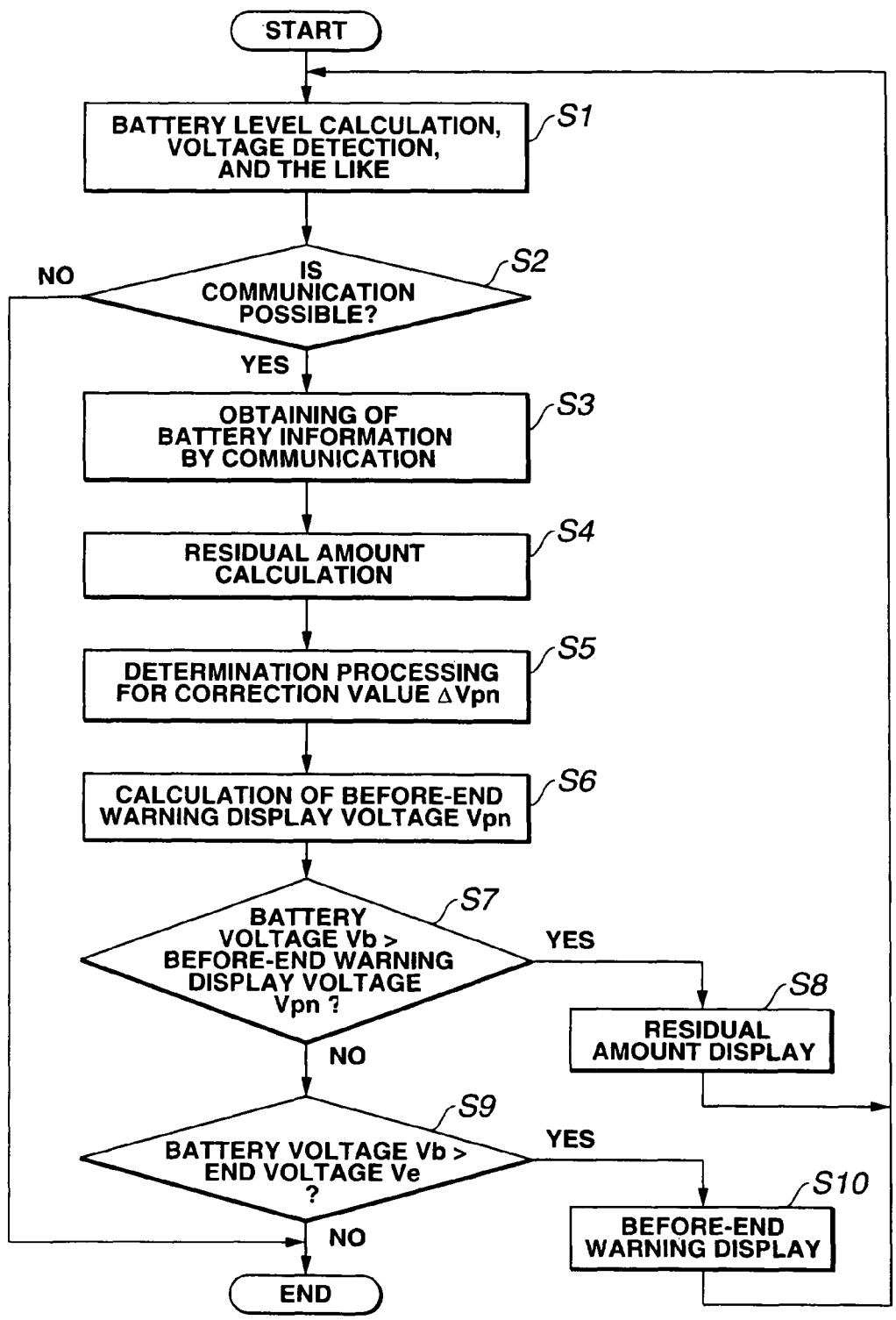
FIG. 4 is a flowchart showing processing of power source control in the camera-integrated video recorder.

Further, in this camera-integrated video recorder, power source control is carried out in accordance with a procedure as shown in FIG. 4.

Specifically, the microcomputer 14 of the video camera recorder body 10 detects the voltage of the power source supplied through the positive and negative terminals 12 and 13, i.e., the battery voltage Vb of the battery pack 20, by the voltage detector section 17 (step S1), to determine whether communication with the microcomputer 24 in the battery pack 20 side is possible (step S2).

If the determination in the step S2 is "NO", which means that communication is not possible, e.g., in case where the microcomputer 24 of the battery pack 20 does not work normally or the battery pack 20 is not connected, the microcomputer 14 in the video camera recorder body 10 then ends the processing.

Otherwise, if the determination in the step S2 is "YES", i.e., if communication with the microcomputer 24 in the battery pack 20 side is possible, the microcomputer 14 in the video camera recorder body 10 obtains a standard capacity as one of the property information items (such as a voltage, current, and a residual battery amount) inherent to the battery pack 20 (step S3) and further carries out a residual amount calculation (step S4).

Next, the microcomputer 14 of the video camera recorder body 10 determines the type of the battery pack 20 (e.g., the cell structure of the cell structure section 25 in this example) based on the standard capacity obtained as a property information item inherent to the battery pack 20, and decides a prior warning display voltage correction value $\Delta Vp$ prior to end of the battery life, corresponding to the battery type (step S5).

Figure 5:
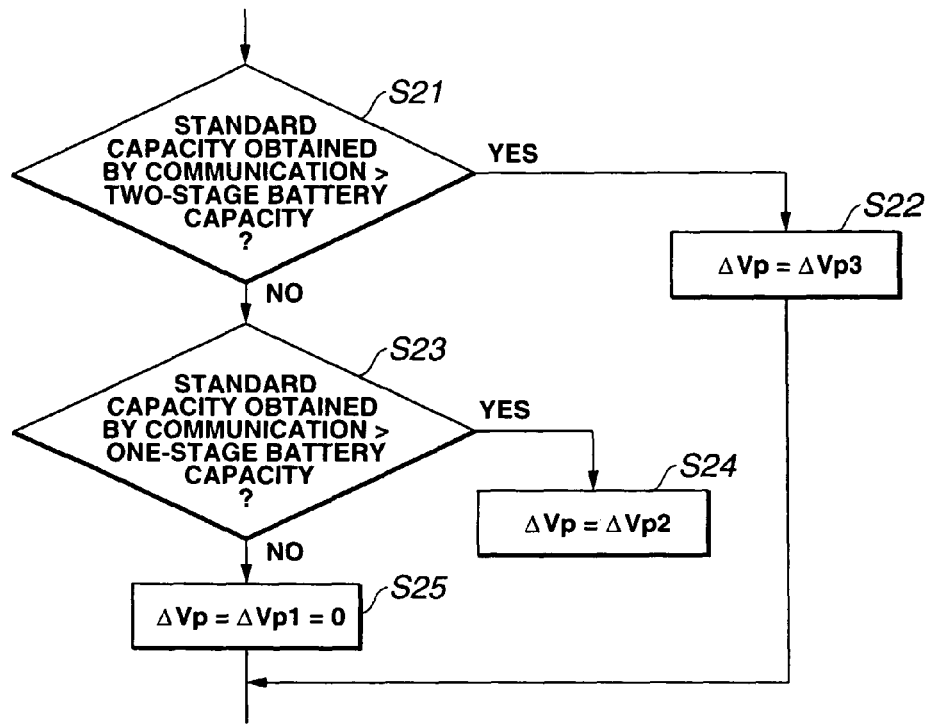
FIG. 5 is a flowchart showing correction value decision processing in the processing procedure of power source control.
Figure 6:
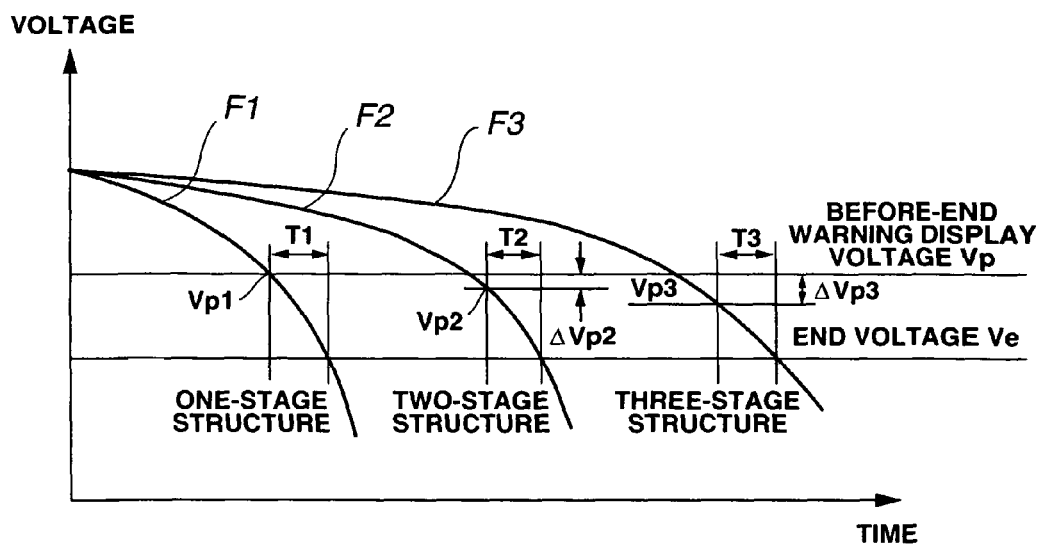
FIG. 6 is a view schematically showing the relationships between the battery discharge characteristics and the warning display times of the battery packs respectively having a one-stage structure, two-stage structure, and three-stage structure in the camera-integrated video recorder.

The correction value decision processing in the step S5 will now be explained specifically with reference to FIG. 5.

That is, in this correction value decision processing, the microcomputer 14 in the video camera recorder body 10 determines whether the standard capacity obtained by communication is larger than the battery capacity of the battery pack having a cell structure section constructed in the two-stage structure (step S21).

Further, if the determination result in the step S21 is "YES", which means that the standard capacity obtained by communication is larger than the battery capacity of the battery pack whose a cell structure section has a two-stage structure, the microcomputer 14 in the video camera recorder body 10 sets the prior warning display voltage correction value $\Delta Vp$ to a correction value $\Delta Vp3$ corresponding to the battery capacity of the battery pack whose cell structure section has a three-stage structure (step S22).

Otherwise, if the determination result in the step S21 is "NO", which means that the standard capacity obtained by communication is smaller than the battery capacity of the battery pack of the battery pack whose cell structure section has a two-stage structure, the microcomputer 14 in the video camera recorder body 10 further determines whether or not the standard capacity obtained by communication is larger than the battery capacity of the battery pack whose cell structure section has a one-stage structure (step S23).

Further, if the determination result in the step S23 is "YES", which means that the standard capacity obtained by communication is larger than the battery capacity of the battery pack whose cell structure section has a one-stage structure, the microcomputer 14 in the video camera recorder body 10 sets the prior warning display voltage correction value ΔVp to a correction value ΔVp2 corresponding to the battery capacity of the battery pack whose cell structure section has a two-stage structure (step S24).

Further, if the determination result in the step S21 is "NO", which means that the standard capacity obtained by communication is smaller than the battery capacity of the battery pack whose cell structure section has a two-stage structure, the microcomputer 14 in the video camera recorder body 10 sets the prior warning display voltage correction value ΔVp to a correction value ΔVp1=0 (step S25).

At this time, the warning display voltage correction value ΔVpn corresponding to the cell structure of the battery pack (where n=1, 2, 3) is stored together with a standard prior warning voltage value Vp in the memory of the microcomputer 14 of the video camera recorder body 10.

After the prior warning display voltage correction value ΔVp is thus decided, the microcomputer 14 of the video camera recorder body 10 subtracts the prior warning display voltage correction value ΔVp from the standard prior warning voltage value Vp thereby to obtain a corrected prior warning display voltage value Vpn in correspondence with the type of the battery pack 20 (step S6).

$$Vpn = Vp - \Delta Vpn \text{ (where } n=1, 2, 3)$$

Then, whether the battery voltage value Vb of the battery pack 20 detected by the voltage detector section 17 in the step S1 is larger than the corrected prior warning voltage value Vpn is determined (step S6).

Also, if the determination result in the step S7 is "YES", which means that the battery voltage Vb of the battery pack 20 is higher than the corrected prior warning display voltage value Vp, the microcomputer 14 of the video camera recorder body 10 controls the display section 15 to display the residual amount calculated by the step S4, so residual amount display is thus carried out (step S8). Thereafter, the microcomputer returns to the step S1 and performs repeatedly the above-described processing.

Otherwise, if the determination result in the step S7 is "NO", which means that the battery voltage Vb of the battery pack 20 is lower than the corrected prior warning display voltage value Vp, the microcomputer 14 of the video camera recorder body 10 determines whether the battery voltage value Vb of the battery pack 20 is higher than the end voltage value Ve (step S9).

If the determination result in the step S9 is "YES", which means that the battery voltage value Vb of the battery pack 20 is higher than the end voltage Ve, the microcomputer 14 of the video camera recorder body 10 controls the display section 15 to display a prior warning (step S10), and then returns to the step S1 and repeatedly performs the processing described above.

Further, if the determination result in the step S9 is "NO", which means that the battery voltage value Vb of the battery pack 20 is smaller than the end voltage value Ve, the microcomputer 14 of the video camera recorder body 10 ends the processing for power source control.

At this time, the battery end voltage value Ve is stored in the memory of the microcomputer 14 in the video camera recorder body 10 or the memory of the microcomputer 24 in the battery pack 20.

In this kind of camera-integrated video recorder, the microcomputer 14 of the video camera recorder body 10 obtains a corrected prior warning display voltage Vpn which is corrected with a voltage correction value ΔVpn decided in accordance with the type of the battery pack 20 based on information concerning the capacity of the cell in the battery pack which is obtained from the battery pack 20. Display of a warning is started when the battery voltage value Vb of the battery pack 20 becomes equal to or lower than the prior warning display voltage value Vpn. The display of the warning ends when the battery voltage value Vb reaches the end voltage value Ve at which use of battery should be ended. Therefore, the prior warning display time prior to end of battery life can be constant with respect to any battery pack having any cell structure, as schematically indicated by the relationships between the battery discharge characteristics F1, F2, and F3 and the warning display times T1, T2, and T3.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A video camera, comprising:
a processor that obtains a capacity value of a battery by communicating over a communications line with a battery pack that contains the battery, the battery providing power to the video camera, the capacity value indicating a number of cell structures in the battery, determines a residual power amount of the battery based on the capacity value, sets a correction value based on the capacity value, determines a type of the battery pack based on the capacity value, stores in a memory the correction value in association with the type of the battery pack, corrects a low power warning voltage value by subtracting the correction value from the low power warning voltage value, generates a low power warning in response to a detected battery voltage being less than or equal to the corrected low power warning voltage value, and generates a display of the residual power amount in response to the detected battery voltage being greater than the corrected low power warning voltage value; and
a display that displays the low power warning or the residual power amount.

2. A video camera as claimed in claim 1, further comprising a detector section that detects the battery voltage.

3. A video camera as claimed in claim 1, further comprising said memory, said processor obtaining the capacity value from said memory.

4. A video camera as claimed in claim 1, wherein said processor generates the low power warning in response to the detected battery voltage being greater than a minimum operating voltage.

5. A video camera as claimed in claim 1, wherein the correction value is a first value when the capacity value exceeds a first predetermined value that is the capacity value of a battery having a first known number of cell structures, the correction value is a second value when the capacity value does not exceed the first predetermined value but exceeds a second predetermined value that is the capacity value of a battery having a second known number of cell structures, the first known number of cell structures being greater than the second known number of cell structures, and the correction value is zero when the capacity value does not exceed the second predetermined value.

6. A video camera system, comprising:
a video camera body;
a battery pack including a battery having at least one battery cell; and
a communications line connected to said video camera body and said battery pack;

said video camera body including:
a processor that obtains a capacity value of said battery by communicating with said battery pack over said communications line, the capacity value indicating a number of cell structures in the battery, determines a residual power amount of the battery based on the capacity value, sets a correction value based on the capacity value, determines a type of the battery pack based on the capacity value, stores in a memory the correction value in association with the type of the battery pack, corrects a low power warning voltage value by subtracting the correction value from the low power warning voltage value, generates a low power warning in response to a detected battery voltage being less than or equal to the corrected low power warning voltage value, and generates a display of the residual power amount in response to the detected battery voltage being greater than the corrected low power warning voltage value, and
a display that displays the low power warning or the residual power amount.

7. A video camera system as claimed in claim 6, wherein said battery pack includes said memory, said processor of said video camera body obtaining the capacity value from said memory.

8. A video camera system as claimed in claim 6, wherein said video camera body includes a detector section operable detect the battery voltage.

9. A video camera system as claimed in claim 6, wherein the correction value is a first value when the capacity value exceeds a first predetermined value that is the capacity value of a battery having a first known number of cell structures, the correction value is a second value when the capacity value does not exceed the first predetermined value but exceeds a second predetermined value that is the capacity value of a battery having a second known number of cell structures, the first known number of cell structures being greater than the second known number of cell structures, and the correction value is zero when the capacity value does not exceed the second predetermined value.

10. A battery pack for a video camera system, said battery pack comprising:
a cell structure section including at least one battery cell and having at least one stage;
a power terminal that supplies power to a video camera body of the video system over a power source line;
a memory that stores a capacity value of said battery in association with a type of said battery pack, the capacity value indicating a number of battery cells in said battery, the type of the battery pack being based on the capacity value;
a communications terminal that provides a connection to a communications line connected between said battery pack and the video camera body; and
a processor that provides the capacity value stored in said memory to the video camera body using said communications terminal and the communications line;
said video camera body thereby determining a residual power amount of the battery based on the capacity value, setting a correction value based on the provided capacity value, correcting a low power warning voltage value by subtracting the correction value from a low power warning voltage value, detecting a battery voltage of said at least one battery cell, generating a low power warning in response to the detected battery voltage being less than or equal to the corrected low power warning voltage value, generating a display of the residual power amount in response to the detected battery voltage being greater than the corrected low power warning voltage value, and displaying the low power warning or the residual power amount.

11. A battery pack as claimed in claim 10, wherein the correction value is a first value when the capacity value exceeds a first predetermined value that is the capacity value when said battery has a first known number of cell structures, the correction value is a second value when the capacity value does not exceed the first predetermined value but exceeds a second predetermined value that is the capacity value of when said battery has a second known number of cell structures, the first known number of cell structures being greater than the second known number of cell structures, and the correction value is zero when the capacity value does not exceed the second predetermined value.

* * * * *